(12) United States Patent
Kumar et al.

(10) Patent No.: US 11,982,378 B2
(45) Date of Patent: May 14, 2024

(54) JOINT ASSEMBLY AND ASSOCIATED METHOD

(71) Applicant: CARRIER CORPORATION, Palm Beach Gardens, FL (US)

(72) Inventors: Elvin Kumar, Haryana (IN); Munish Kumar, Haryana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 132 days.

(21) Appl. No.: 17/252,389

(22) PCT Filed: Aug. 24, 2020

(86) PCT No.: PCT/IB2020/057898
§ 371 (c)(1),
(2) Date: Dec. 15, 2020

(87) PCT Pub. No.: WO2021/044247
PCT Pub. Date: Mar. 11, 2021

(65) Prior Publication Data
US 2022/0252187 A1 Aug. 11, 2022

(30) Foreign Application Priority Data
Sep. 6, 2019 (IN) .............................. 201911036036

(51) Int. Cl.
*F16L 13/02* (2006.01)
(52) U.S. Cl.
CPC .................................. *F16L 13/02* (2013.01)

(58) Field of Classification Search
CPC ................................ F16L 13/02; F16L 23/006
See application file for complete search history.

(56) References Cited

U.S. PATENT DOCUMENTS 4,985,975 A 1/1991 Austin et al.

FOREIGN PATENT DOCUMENTS

| CN | 204852709 U | 12/2015 |
| DE | 749755 | 12/1944 |
| GB | 709794 | 6/1954 |
| GB | 2455565 A | 6/2009 |
| TW | M529098 U | 9/2016 |

OTHER PUBLICATIONS

International Search Report for International Application No. PCT/IB2020/057898; Application Filing Date: Aug. 24, 2020; dated Nov. 20, 2020; 4 pages.
Written Opinion for International Application No. PCT/IB2020/057898; Application Filing Date: Aug. 24, 2020; dated Nov. 20, 2020; 12 pages.
Chinese Office Action for Application No. 202080003537.7, Issued Aug. 25, 2022, 10 Pages.

*Primary Examiner* — Robert G Bachner
(74) *Attorney, Agent, or Firm* — CANTOR COLBURN LLP

(57) ABSTRACT

A joint assembly comprising a first cup and a second cup for joining a first pipe and a second pipe. The first and the second pipes have an offset in a three-dimensional space having 'x', 'y', and 'z' dimensions, where the longitudinal axes of the first and the second pipes are in the 'z' dimension. The first cup and the second cup are adapted to join the first pipe with the second pipe by compensating for the offset in the 'x', 'y', and 'z' dimensions.

20 Claims, 5 Drawing Sheets

JOINT ASSEMBLY AND ASSOCIATED METHOD

TECHNICAL FIELD OF INVENTION

The present invention generally relates to a joint assembly. More particularly, the present invention relates to a joint assembly for correcting a three-dimensional offset between two pipes.

BACKGROUND OF THE INVENTION

In many appliances and industrial equipment that use manipulation of fluids, a common problem that arises during manufacturing is creation of offsets at pipe joints that occur due to cumulative effect of tolerances of various components in such equipment, such as boilers, refrigerators, air conditioning units, chillers, oil or gas pipelines, fire hydrant systems, etc. In many instances, such offsets are corrected by pipe joints available in the market such as or by using grooved pipe couplings. However, such couplings have many limitations, such as, inability to withstand high temperature and pressure fluids, and a low tolerance correction capability of about 1-2 mm. There are other types of joints also available such as a rolling offset joint, but such type of a joint is not useful in tight (limited available) spaces where a small distance separates the pipes. Thus, there is a need in the art for pipe joints that can connect two fixed pipes having a large offset, can withstand high temperatures and pressures, and can be placed in tight spaces.

There can be various application areas where such pipe joints are required or can provide an improvement in the existing systems. For example, many conventional chiller systems use a copper pipe arrangement to connect a discharge system with a compressor. The copper pipe arrangement provides some flexibility to accommodate the offsets caused by the cumulative effect of the individual tolerances of various parts of the chiller system. However, the copper pipe arrangement requires a number of additional parts that results in higher manufacturing and maintenance costs and a reduction in efficiency of the chiller system.

As an alternative to the copper pipe arrangement, fixed pipes can be used to join the discharge assembly and the compressor, however, the fixed pipes that connect the discharge assembly and the compressor respectively, need to be joined together using a joint that can accommodate the aforementioned cumulative tolerance offset in a constrained space while tolerating high pressure and temperature fluids flowing through the joint.

Therefore, there is a continued need in the art for joints/joint assemblies for joining fixed pipes with a three-dimensional offset, especially in circumstances where high temperature and pressure fluid flows through the joints and in tight spaces having a small distance separating the pipes. Further, there is a need in the art for joints where offsets can be mitigated without changing the pressure of the fluid flow.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

Aspects of the present invention relate to a joint assembly. The joint assembly comprises a first cup and a second cup for joining a first pipe and a second pipe. The first and the second pipes have an offset in a three-dimensional space having 'x', 'y', and 'z' dimensions, where the longitudinal axes of the first and the second pipes are in the 'z' dimension. The first cup comprises a first pipe connecting portion having a first central axis in the 'z' dimension, a first central cavity portion coupled with the first pipe connecting portion and aligned with the first central axis, and a first flange portion coupled with the first central cavity portion, wherein the first flange portion has a first contact surface in the 'x' and 'y' dimensions. The second cup comprises a second pipe connecting portion having a second central axis in the 'z' dimension, a second central cavity portion coupled with the second pipe connecting portion and aligned with the second central axis, and a second flange portion coupled with the second central cavity portion, where the second flange portion has a second contact surface in the 'x' and y' dimensions. The first cup and the second cup are adapted to join the first pipe with the second pipe by compensating for the offset in the 'x', 'y', and 'z' dimensions.

According to some aspects, the first pipe connecting portion is adapted to be concentric with the first pipe and slidably fit with the first pipe, and wherein the first pipe connecting portion has a length adapted to slide along the first pipe to compensate for an offset in the 'z' dimension.

According to some aspects, the second pipe connecting portion is adapted to be concentric with the second pipe and slidably fit with the second pipe, and wherein the second pipe connecting portion has a length adapted to slide along the second pipe to compensate for an offset in the 'z' dimension.

According to some aspects, the first flange portion and the second flange portions are adapted to contact at the first contact surface and the second contact surface, such that the first central cavity portion and the second central cavity portion join to form a fluid flow path between the first pipe and the second pipe.

According to some aspects, the first contact surface and the second contact surface have a contact region that compensates for off-sets in the 'x' and 'y' dimensions such that the flow path has a minimum circumferential area that is greater than or equal to the smaller of the circumferential areas of the first pipe or the second pipe.

According to some aspects, the first contact surface and the second contact surface are welded together at the contact region.

According to some aspects, the first pipe connecting portion and the first pipe are welded together to form a sealed connection between the first pipe and the first cup.

According to some aspects, the second pipe connecting portion and the second pipe are welded together to form a sealed connection between the second pipe and the second cup.

According to some aspects, the first contact surface and the second contact surface have interlocking patterns that prevents relative movement between the first and second contact surfaces upon contact.

According to some aspects, the first pipe connecting portion and the first pipe have threads to screw fit the first pipe connecting portion with the first pipe.

According to some aspects, the second pipe connecting portion and the second pipe have threads to screw fit the second pipe connecting portion with the second pipe.

According to some aspects, the first pipe connecting portion and the first pipe have longitudinal grooves to slidably fit the first pipe connecting portion with the first pipe.

According to some aspects, the second pipe connecting portion and the second pipe have longitudinal grooves to slidably fit the second pipe connecting portion with the second pipe.

According to some aspects, the first cup and the second cup are made of a metal or a metal alloy.

According to some aspects, the first cup and the second cup are made of stainless steel.

According to some aspects, the first cup and the second cup are welded together by at least one of MIG, TIG, Stick and Flux-Cored arc welding processes.

Aspects of the present invention also relate to a method comprising the steps of: providing a joint assembly comprising a first cup and a second cup for joining a first pipe and a second pipe, the first and the second pipes having an offset in a three-dimensional space having 'x', 'y' and 'z' dimensions, where the longitudinal axes of the first and the second pipes are in the 'z' dimension; slidably fitting a first pipe connecting portion of the first cup with the first pipe, where the first pipe connecting portion is adapted to be concentric with the first pipe and has a length adapted to slide along the first pipe to compensate for an offset in the 'z' dimension; slidably fitting a second pipe connecting portion of the second cup with the second pipe, where the second pipe connecting portion is adapted to be concentric with the second pipe and has a length adapted to slide along the second pipe to compensate for an offset in the 'z' dimension; and contacting a first contact surface of a first flange portion of the first cup with a second contact surface of a second flange portion of the second cup, such that a first central cavity portion of the first cup and a second central cavity portion of the second cup join to form a fluid flow path between the first pipe and the second pipe. The first contact surface and the second surface have a contact region that compensates for off-sets in the 'x' and 'y' dimensions such that the flow path has a minimum circumferential area that is greater than or equal to the smaller of the circumferential areas of the first pipe or the second pipe.

According to some aspects, the method comprises the step of welding the first contact surface and the second contact surface at the contact region after compensating for off-sets in the 'x' and 'y' dimensions.

According to some aspects, the method comprises the step of welding the first pipe connecting portion with the first pipe after compensating for the off-set in the dimension.

According to some aspects, the method comprises the step of welding the second pipe connecting portion with the second pipe after compensating for the off-set in the dimension.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF ACCOMPANYING DRAWINGS

Some of the objects of the invention have been set forth above. These and other objects, features, aspects and advantages of the present invention will become better understood with regard to the following description, appended claims and accompanying drawings where:

FIGS. 1A and 1B are schematic views of a joint assembly, wherein FIG. 1A is a schematic view illustrating the joint assembly in an open state, and wherein FIG. 1B is a schematic view illustrating the joint assembly in a joined state;

Corresponding reference numerals indicate corresponding parts throughout the drawings.

DETAILED DESCRIPTION OF INVENTION

Figure 1A:
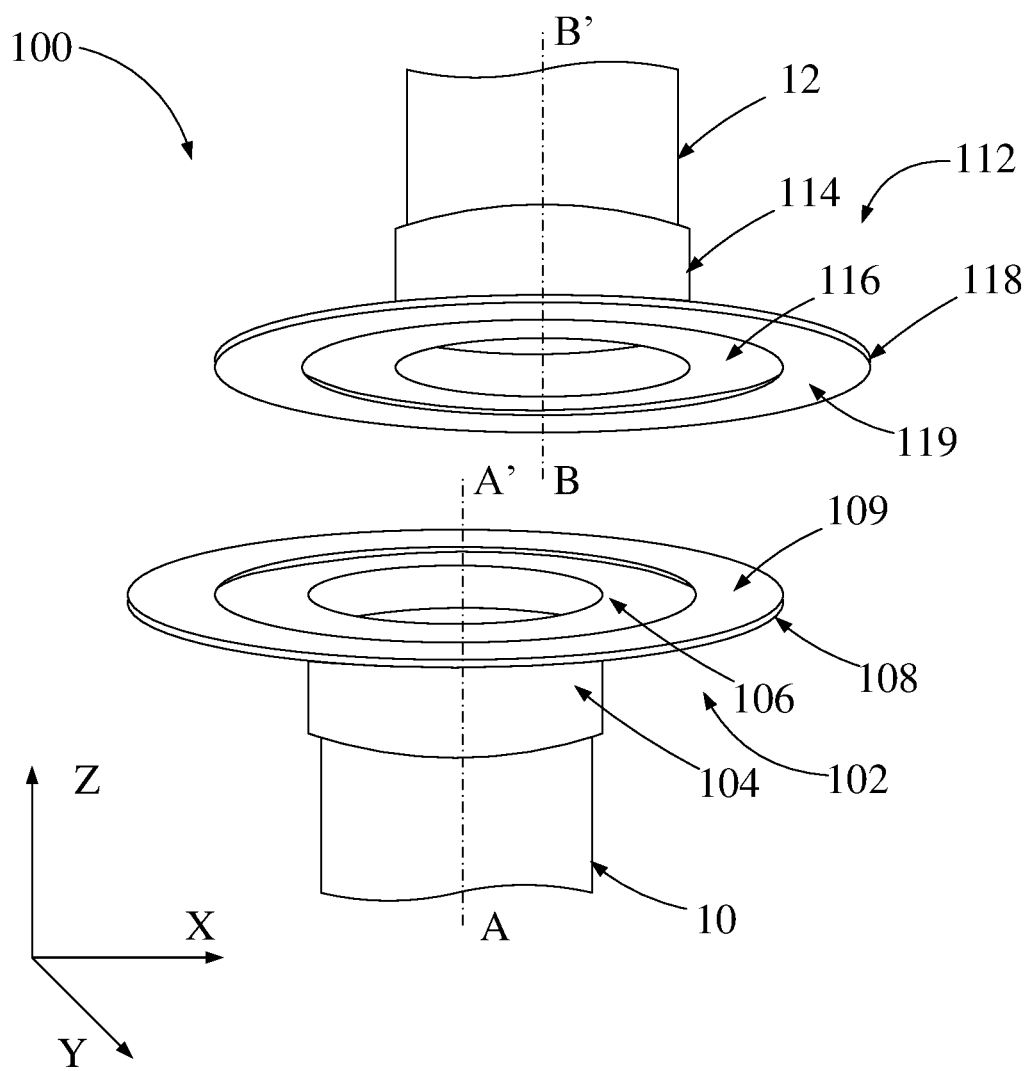

The following detailed description should be read with reference to the drawings in which similar elements in different drawings are numbered the same. The drawings, which are not necessarily to scale, depict illustrative embodiments and are not intended to limit the scope of the invention. Although examples of construction, dimensions, and materials are illustrated for the various elements, those skilled in the art will recognize that many of the examples provided have suitable alternatives that may be utilized.

Overview

Described herein is a joint assembly. The joint assembly comprising a first cup and a second cup for joining a first pipe and a second pipe. The first and the second pipes having an offset in a three-dimensional space having 'x', 'y', and 'z' dimensions, where the longitudinal axes of the first and the second pipes are in the 'z' dimension. The first cup comprises a first pipe connecting portion having a first central axis in the 'z' dimension, a first central cavity portion coupled with the first pipe connecting portion and aligned with the first central axis, and a first flange portion coupled with the first central cavity portion, wherein the first flange portion has a first contact surface in the 'x' and 'y' dimensions. The second cup comprises a second pipe connecting portion having a second central axis in the 'z' dimension, a second central cavity portion coupled with the second pipe connecting portion and aligned with the second central axis, and a second flange portion coupled with the second central cavity portion, where the second flange portion has a second contact surface in the 'x' and 'y' dimensions. The first cup and the second cup are adapted to join the first pipe with the second pipe by compensating for the offset in the 'x', 'y', and 'z' dimensions.

Also described herein is a method comprising the steps of: providing a joint assembly comprising a first cup and a second cup for joining a first pipe and a second pipe, the first and the second pipes having an offset in a three-dimensional space having 'y' and 'z' dimensions, where the longitudinal axes of the first and the second pipes are in the 'z' dimension; slidably fitting a first pipe connecting portion of the first cup with the first pipe, where the first pipe connecting portion is adapted to be concentric with the first pipe and has a length adapted to slide along the first pipe to compensate for an offset in the 'z' dimension; slidably fitting a second pipe connecting portion of the second cup with the second pipe, where the second pipe connecting portion is adapted to be concentric with the second pipe and has a length adapted to slide along the second pipe to compensate for an offset in the 'z' dimension; and contacting a first contact surface of a first flange portion of the first cup with a second contact surface of a second flange portion of the second cup, such that a first central cavity portion of the first cup and a second central cavity portion of the second cup join to form a fluid flow path between the first pipe and the second pipe. The first contact surface and the second surface have a contact region that compensates for off-sets in the 'x' and 'y' dimensions such that the flow path has a minimum circumferential area that is greater than or equal to the smaller of the circumferential areas of the first pipe or the second pipe.

DESCRIPTION OF EMBODIMENTS

Figure 1B:
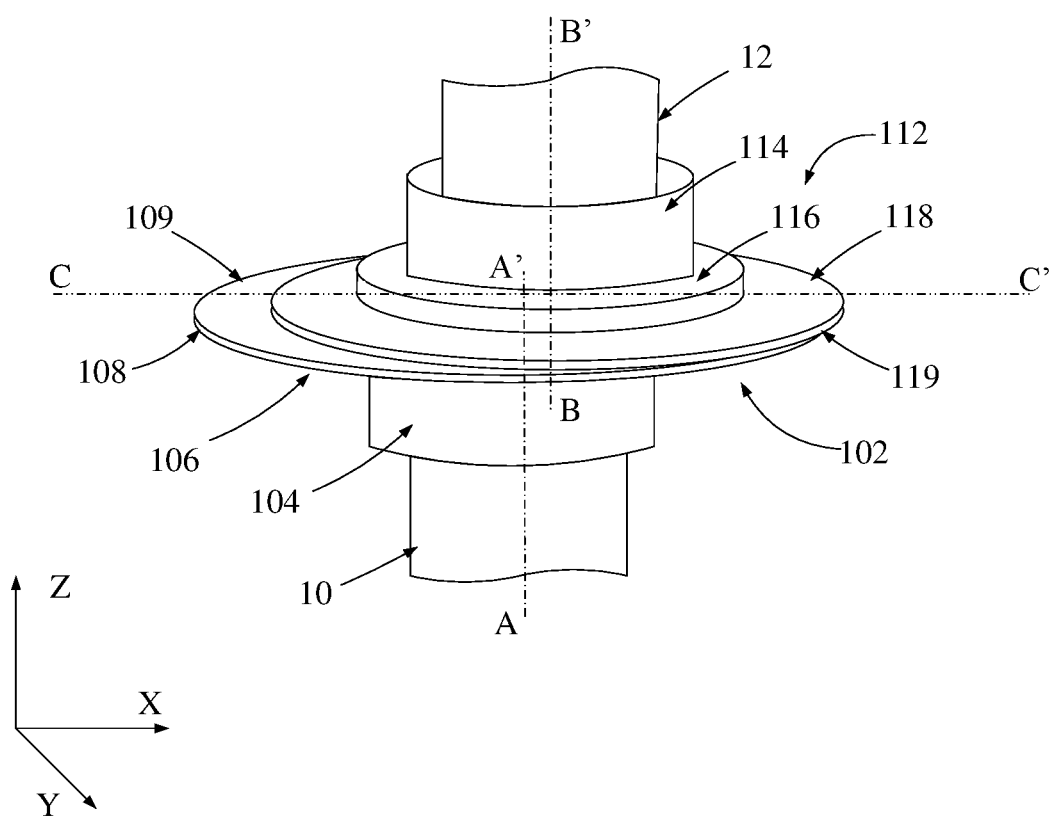

FIGS. 1A and 1B are schematic views of a joint assembly 100, wherein FIG. 1A is a schematic view illustrating the joint assembly 100 in an open state, and wherein FIG. 1B is a schematic view illustrating the joint assembly 100 in a joined state. As shown, the joint assembly 100 comprises a first cup 102 and a second cup 112 for joining a first pipe 10 and a second pipe 12. The first pipe 10 and the second pipe 12 have an offset in a three-dimensional space having 'x', 'y', and 'z' dimensions, where the longitudinal axes of the first pipe 10 and the second pipe 12 are in the 'z' dimension.

The first cup 102 comprises a first pipe connecting portion 104 having a first central axis AA' in the 'z' dimension, a first central cavity portion 106 coupled with the first pipe connecting portion 104 and aligned with the first central axis AA', and a first flange portion 108 coupled with the first central cavity portion 106. The first flange portion 108 has a first contact surface 109 in the 'x' and 'y' dimensions.

The second cup 112 comprises a second pipe connecting portion 114 having a second central axis BB' in the 'z' dimension, a second central cavity portion 116 coupled with the second pipe connecting portion 114 and aligned with the second central axis BB', and a second flange portion 118 coupled with the second central cavity portion 116, where the second flange portion 118 has a second contact surface 119 in the 'x' and 'y' dimensions.

Referring to FIG. 1B, the first cup 102 and the second cup 112 are adapted to join the first pipe 10 with the second pipe 12 by compensating for the offset in the 'x', 'y', and 'z' dimensions.

Referring to FIG. 1A, in some embodiments, the first pipe connecting portion 104 is adapted to be concentric with the first pipe 10 and slidably fit with the first pipe 10. The first pipe connecting portion 104 has a length adapted to slide along the first pipe 10 to compensate for a predetermined offset in the 'z' dimension. For example, in some embodiments, the first pipe connecting portion 104 has a length to compensate for an offset in the range of 1 mm-50 mm in the 'z' dimension. Other embodiments may compensate for a longer offset depending upon the available space in the 'z' dimension.

Referring to FIG. 1A, in some embodiments, the second pipe connecting portion 114 is adapted to be concentric with the second pipe 12 and slidably fit with the second pipe 12. The second pipe connecting portion 114 has a length adapted to slide along the second pipe 12 to compensate for an offset in the 'z' dimension. For example, in some embodiments, the second pipe connecting portion 114 has a length to compensate for an offset in the range of 1 mm-50 mm in the dimension. Other embodiments may compensate for a longer offset depending upon the available space in the dimension.

Figure 2:
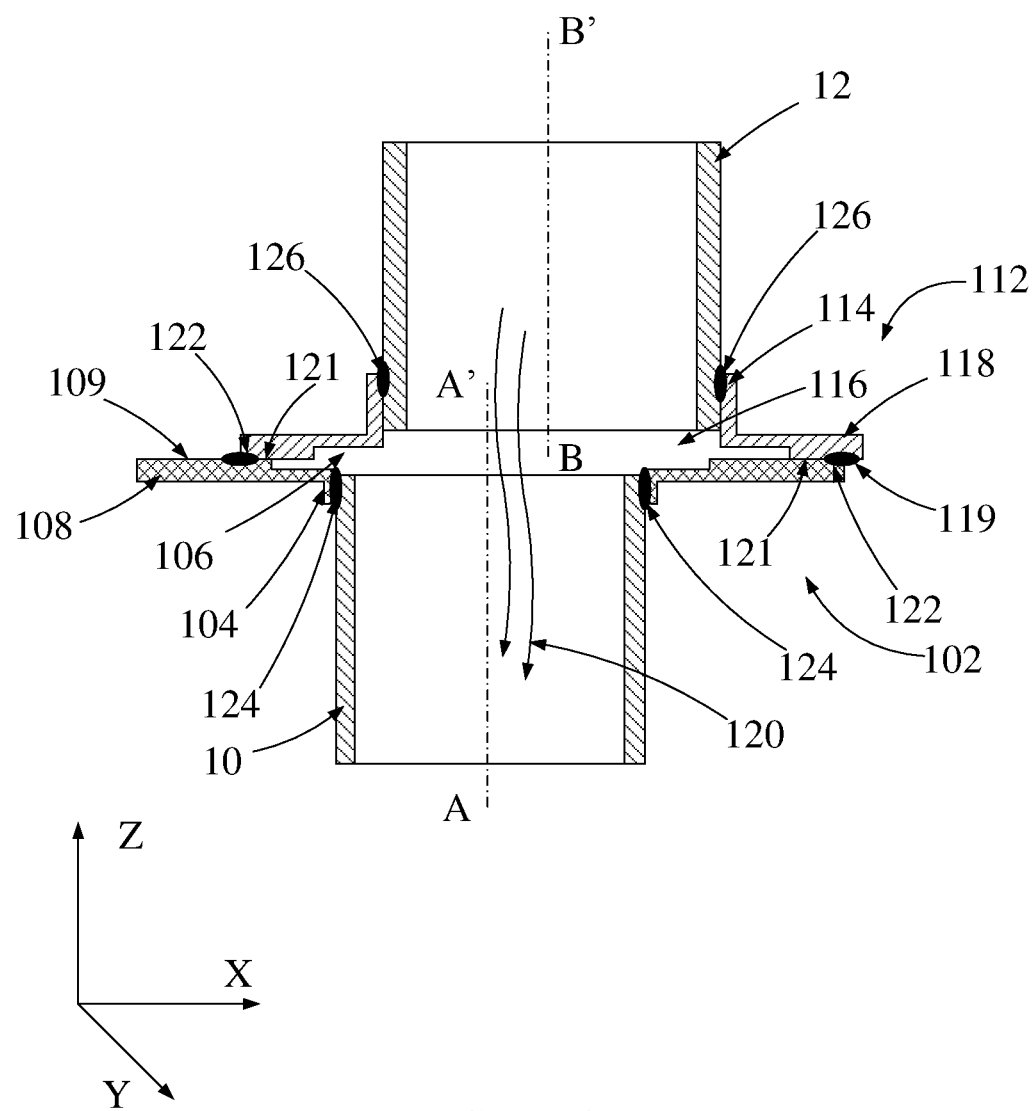
FIG. 2 is a schematic cross-sectional view of the joint assembly in the joined state sectioned about the line CC' of FIG. 1B.

FIG. 2 is a schematic cross-sectional view of the joint assembly 100 in a joined state, sectioned about the line CC' of FIG. 1B. Referring to FIG. 2 and FIG. 1B, in some embodiments, the first flange portion 108 and the second flange portion 118 are adapted to contact at the first contact surface 109 and the second contact surface 119, such that the first central cavity portion 106 and the second central cavity portion 116 join to form a fluid flow path 120 between the first pipe 10 and the second pipe 12.

In some embodiments, the first contact surface 109 and the second contact surface 119 have a contact region 121 that compensates for off-sets in the 'x' and 'y' dimensions such that the flow path 120 has a minimum circumferential area that is greater than or equal to the smaller of the circumferential areas of the first pipe 10 or the second pipe 12. In some embodiments, the first contact surface 109 and the second contact surface 119 have a surface area, such that the contact region 121 can compensate for an offset of 1 mm-20 mm in the dimension and an offset of 1 mm-20 mm in the dimension. Other embodiments may compensate for a longer offset depending upon the available space in the 'x' dimension and the 'y' dimension.

Referring to FIG. 2, in some embodiments, to seal the joint assembly 100 after compensating for the three-dimensional offsets, the first contact surface 109 and the second contact surface 119 are welded together at the contact region 121 by weld joints 122. Also, the first pipe connecting portion 104 and the first pipe 10 are welded together to form a sealed connection between the first pipe 10 and the first cup 102 by weld joints 124. Further, the second pipe connecting portion 114 and the second pipe 12 are welded together to form a sealed connection between the second pipe 12 and the second cup 112 by weld joints 126.

In some embodiments, the first contact surface 109 and the second contact surface 119 may be designed to prevent relative movement between the contact surfaces 109,119. For example, in some embodiments, the first contact surface 109 and the second contact surface 119 have interlocking patterns that prevents relative movement between the first and second contact surfaces 109, 119 upon contact.

In some embodiments, the contact surface 109 and the contact surface 119 may be smooth to allow for relative movement between the contact surfaces 109, 119 for adjustments to the offset correction prior to welding of the contact surfaces 109, 119 together.

In some embodiments, the first pipe connecting portion 104 and the first pipe 10 may be configured to be coupled with each other to allow for controlled relative movement in the 'z' dimension between the first pipe 10 and the first pipe connecting portion 104 after their connection. For example, in some embodiments, the first pipe connecting portion 104 and the first pipe 10 have threads to screw fit the first pipe connecting portion 104 with the first pipe 10. In some other embodiments, the first pipe connecting portion 104 and the first pipe 10 have longitudinal grooves to slidably fit the first pipe connecting portion 104 with the first pipe 10. In some other embodiments, the contacting surfaces of the first pipe connecting portion 104 with the first pipe 10 may be smooth to allow for sliding of the first pipe connecting portion 104 on the first pipe 10.

In some embodiments, the second pipe connecting portion 114 and the second pipe 12 may be configured to be coupled with each other to allow for controlled relative movement in the 'z' dimension between the second pipe 12 and the second pipe connecting portion 114 after their connection. For example, in some embodiments, the second pipe connecting portion 114 and the second pipe 12 have threads to screw fit the second pipe connecting portion 114 with the second pipe 12. In some other embodiments, the second pipe connecting portion 114 and the second pipe 12 have longitudinal grooves to slidably fit the second pipe connecting portion 114 with the second pipe 12. In some other embodiments, the contacting surfaces of the second pipe connecting portion 114 with the second pipe 12 may be smooth to allow for sliding of the second pipe connecting portion 114 on the second pipe 12.

The joint assembly 100 and its components are made of any strong and durable material that can sustain high pressure and high temperature fluids. For example, in some embodiments, the first cup 102 and the second cup 112 are made of a metal or a metal ahoy, such as, stainless steel. In some embodiments, the first cup 102 and the second cup 112 are made of stainless steel of thickness ranging between 0.1 mm-50 mm. Other materials that can be used to make joints using the first cup 102 and the second cup 112, such as, European standard. Ferrous grade EN 13445, SS 304, SS316 and the like ASME standard SA 516-60 & 70.

The welding of the joint assembly 100 with the pipes 10, 12 can be performed by a number of known welding processes. For example, in some embodiments, the first cup 102 and the second cup 112 are welded together by at least one of MIG, TIG, Stick and Flux-Cored arc welding processes. The material to be used for welding can be a ferrous grade coupling material, for example, Chinese standard, GB6654-20R & Q235, ASME standard SA 516-60 & 70, Indian Standard IS-2062 and the like. These materials are certified material used for pressure fluid vessels.

Figure 3:
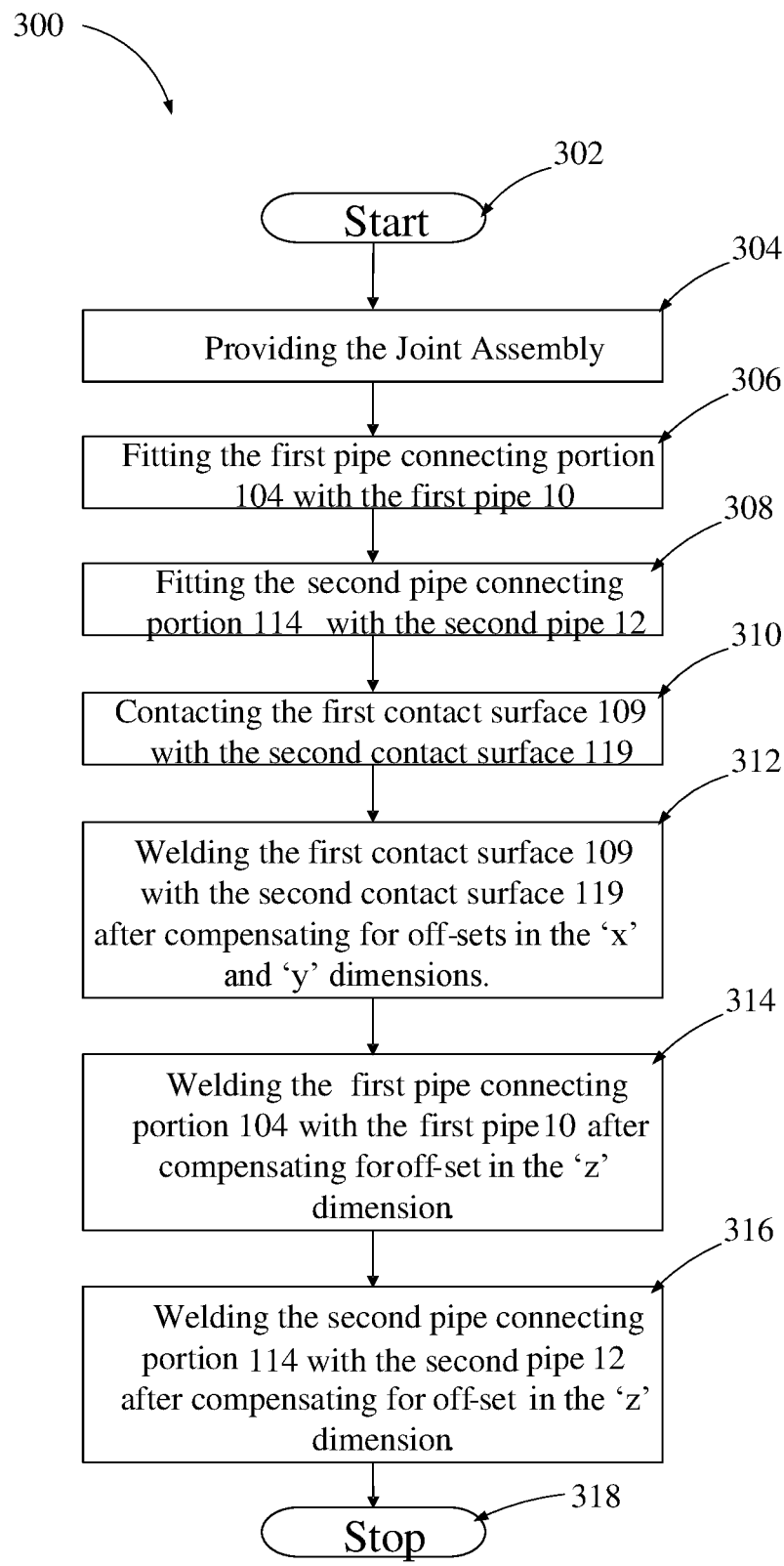
FIG. 3 is a flow chart representing a method of joining two pipes having a three-dimensional offset using the joint assembly.

FIG. 3 is a flow chart 300 representing an exemplary method of joining two pipes 10, 12 having a three-dimensional offset using the joint assembly 100. The method flowchart 300 starts at step 302.

In a first step 304, the joint assembly 100 comprising the first cup 102 and the second cup 112 for joining a first pipe 10 and a second pipe 12 is provided.

In a second step 306, a first pipe connecting portion 104 of the first cup is slidably fitted with the first pipe 10.

In a third step 308, the second pipe connecting portion 114 of the second cup 112 is slidably fitted with the second pipe 12.

In a fourth step 310, a first contact surface 109 of a first flange portion 108 of the first cup 102 is contacted with a second contact surface 119 of a second flange portion 118 of the second cup 112, such that the first central cavity portion 106 and the second central cavity portion 116 join to form the fluid flow path 120 between the first pipe 10 and the second pipe 12.

In a fifth step 312, the first contact surface 109 and the second contact surface 119 are welded together at the contact region after compensating for off-sets in the 'x' and dimensions. In some embodiments, the contact surfaces 109, 119 are welded at their edges or at circumference of the contact region.

In a sixth step 314, the first pipe connecting portion 104 is welded to the first pipe 10 after compensating for the offset in the dimension.

In a seventh step 316, the second pipe connecting portion 114 with the second pipe 12 after compensating for the offset in the 'z' dimension.

The flowchart 300 stops at step 318.

The method described by the above steps allows for compensation of offsets in 'x', 'y', and 'z' dimensions between the first pipe 10 and the second pipe 12. The joint assembly 100 after being welded, can withstand high temperature and pressure fluids and can be accommodated in tight spaces.

Figure 4:
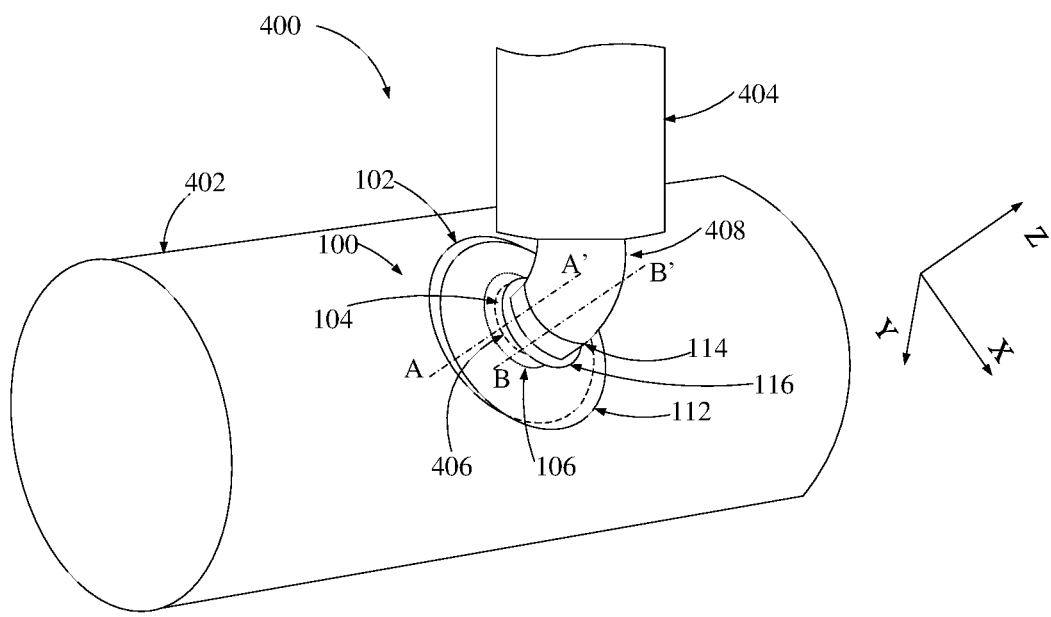
FIG. 4 is a schematic view of an exemplary use of the joint assembly.

FIG. 4 is a schematic view of an exemplary use of the joint assembly. The figure shows a sub-section of a chiller system 400, where discharge assembly 402 of the system 400 is connected to a compressor (not shown) via a discharge line 404. The discharge assembly 402 includes a pipe 406 and the discharge line 404 includes a pipe 408 having a three-dimensional offset due to the cumulative effect of the tolerances of all the components within the chiller system. To counteract this cumulative tolerance, the pipes 406 and 408 are connected via the joint assembly 100. As shown, the first cup 102 and the second cup 112 join together in an overlapping fashion to compensate for the offsets in the plane perpendicular to the central axes, AA' and BB' of the pipes 406 and 408 respectively, assumed here as the 'x-y' plane. Also, the pipe connecting portions 104, 114 compensate any offset in the 'z' dimension, i.e., along the central axes AA' and BB'.

As can be seen the joint assembly 100 allows for compensation for a three dimensional off-set in the chiller system 400, where high pressure and high temperature fluids flow from the compressor to the discharge assembly 402, Further, the joint assembly 100 is accommodated in a tight space close to the discharge assembly 402.

The present invention is applicable to various fields such as, but is not limited to, water treatment or management, oil & gas, chemicals, air conditioning, refrigeration, and any such field that is obvious to a person skilled in the art.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

We claim:

1. A joint assembly comprising:
   a first cup and a second cup for joining a first pipe and a second pipe, the first and the second pipes having an offset in a three-dimensional space having 'x', 'y', and 'z' dimensions, where the longitudinal axes of the first and the second pipes are in the 'z' dimension,
   the first cup comprising:
   a first pipe connecting portion having a first central axis in the 'z' dimension, a first central cavity portion coupled with the first pipe connecting portion and aligned with the first central axis, and a first flange portion coupled with the first central cavity portion, wherein the first flange portion has a first contact surface in the 'x' and 'y' dimensions; and the second cup comprising:

a second pipe connecting portion having a second central axis in the 'z' dimension, a second central cavity portion coupled with the second pipe connecting portion and aligned with the second central axis, and a second flange portion coupled with the second central cavity portion, where the second flange portion has a second contact surface in the 'x' and 'y' dimensions;

wherein the first cup and the second cup are adapted to join the first pipe with the second pipe by compensating for the offset in the 'x', 'y', and 'z' dimensions.

2. The joint assembly of claim 1, comprising:

wherein the first pipe connecting portion is adapted to be concentric with the first pipe and slidably fit with the first pipe, and wherein the first pipe connecting portion has a length adapted to slide along the first pipe to compensate for an offset in the 'z' dimension.

3. The joint assembly of claim 1, comprising:

wherein the second pipe connecting portion is adapted to be concentric with the second pipe and slidably fit with the second pipe, and wherein the second pipe connecting portion has a length adapted to slide along the second pipe to compensate for an offset in the 'z' dimension.

4. The joint assembly of claim 1, comprising:

wherein the first flange portion and the second flange portions are adapted to contact at the first contact surface and the second contact surface, such that the first central cavity portion and the second central cavity portion join to form a fluid flow path between the first pipe and the second pipe.

5. The joint assembly of claim 4, comprising:

wherein the first contact surface and the second contact surface have a contact region that compensates for off-sets in the 'x' and 'y' dimensions such that the flow path has a minimum circumferential area that is greater than or equal to the smaller of the circumferential areas of the first pipe or the second pipe.

6. The joint assembly of claim 5, comprising:

wherein the first contact surface and the second contact surface are welded together at the contact region.

7. The joint assembly of claim 6, comprising:

wherein the first pipe connecting portion and the first pipe are welded together to form a sealed connection between the first pipe and the first cup.

8. The joint assembly of claim 7, comprising:

wherein the second pipe connecting portion and the second pipe are welded together to form a sealed connection between the second pipe and the second cup.

9. The joint assembly of claim 4, comprising:

wherein the first contact surface and the second contact surface have interlocking patterns that prevent relative movement between the first and second contact surfaces upon contact.

10. The joint assembly of claim 1, wherein the first pipe connecting portion and the first pipe have threads to screw fit the first pipe connecting portion with the first pipe.

11. The joint assembly of claim 1, wherein the second pipe connecting portion and the second pipe have threads to screw fit the second pipe connecting portion with the second pipe.

12. The joint assembly of claim 1, wherein the first pipe connecting portion and the first pipe have longitudinal grooves to slidably fit the first pipe connecting portion with the first pipe.

13. The joint assembly of claim 1, wherein the second pipe connecting portion and the second pipe have longitudinal grooves to slidably fit the second pipe connecting portion with the second pipe.

14. The joint assembly of claim 1, wherein the first cup and the second cup are made of metal or metal alloy.

15. The joint assembly of claim 14, wherein the first cup and the second cup are made of stainless steel.

16. The joint assembly of claim 14, wherein the first cup and the second cup are welded together by at least one of MIG, TIG, Stick and Flux-Cored arc welding processes.

17. A method comprising:

providing a joint assembly comprising a first cup and a second cup for joining a first pipe and a second pipe, the first and the second pipes having an offset in a three-dimensional space having 'x', 'y' and 'z' dimensions, where the longitudinal axes of the first and the second pipes are in the 'z' dimension;

slidably fitting a first pipe connecting portion of the first cup with the first pipe, where the first pipe connecting portion is adapted to be concentric with the first pipe and has a length adapted to slide along the first pipe to compensate for an offset in the 'z' dimension;

slidably fitting a second pipe connecting portion of the second cup with the second pipe, where the second pipe connecting portion is adapted to be concentric with the second pipe and has a length adapted to slide along the second pipe to compensate for an offset in the 'z' dimension; and contacting a first contact surface of a first flange portion of the first cup with a second contact surface of a second flange portion of the second cup, such that a first central cavity portion of the first cup and a second central cavity portion of the second cup join to form a fluid flow path between the first pipe and the second pipe, wherein the first contact surface and the second surface have a contact region that compensates for off-sets in the 'x' and 'y' dimensions such that the flow path has a minimum circumferential area that is greater than or equal to the smaller of the circumferential areas of the first pipe or the second pipe.

18. The method of claim 17 comprising:

welding the first contact surface and the second contact surface at the contact region after compensating for off-sets in the 'x' and 'y' dimensions.

19. The method of claim 17 comprising:

welding the first pipe connecting portion with the first pipe after compensating for the off-set in the 'z' dimension.

20. The method of claim 17 comprising:

welding the second pipe connecting portion with the second pipe after compensating for the off-set in the 'z' dimension.

* * * * *